United States Patent
Yu et al.

(10) Patent No.: US 8,423,830 B2
(45) Date of Patent: Apr. 16, 2013

(54) DEBUG METHOD FOR COMPUTER SYSTEM

(75) Inventors: Chun-Jie Yu, Keelung (TW); Chun-Yi Lu, Tao Yuan Shien (TW); Yu-Hui Chen, Tao Yuan Shien (TW); Chih-Hung Kuo, Taipei County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 326 days.

(21) Appl. No.: 12/950,005

(22) Filed: Nov. 19, 2010

(65) Prior Publication Data

US 2011/0302453 A1    Dec. 8, 2011

(30) Foreign Application Priority Data

Jun. 4, 2010   (TW) ................................ 99118226 A

(51) Int. Cl.
*G06F 11/00*   (2006.01)
(52) U.S. Cl.
USPC .............................................. 714/35; 714/6.1
(58) Field of Classification Search ...................... 714/35
See application file for complete search history.

(56) References Cited

U.S. PATENT DOCUMENTS

| | | | |
|---|---|---|---|
| 5,488,688 A * | 1/1996 | Gonzales et al. ................ | 714/34 |
| 6,345,383 B1 * | 2/2002 | Ueki ............................. | 717/124 |
| 7,269,768 B2 * | 9/2007 | Rothman et al. ............... | 714/723 |
| 7,428,661 B2 * | 9/2008 | Michael .......................... | 714/27 |
| 7,543,185 B2 * | 6/2009 | Boyce ............................. | 714/32 |
| 7,565,579 B2 | 7/2009 | Shi | |
| 2003/0061020 A1 * | 3/2003 | Michael .......................... | 703/28 |
| 2004/0010773 A1 * | 1/2004 | Chan et al. ..................... | 717/104 |
| 2004/0164990 A1 * | 8/2004 | Chan et al. ..................... | 345/581 |
| 2005/0223296 A1 * | 10/2005 | Usui ............................... | 714/39 |
| 2005/0229160 A1 * | 10/2005 | Rothman et al. ............... | 717/124 |
| 2008/0010544 A1 * | 1/2008 | Boyce ............................. | 714/39 |
| 2008/0307193 A1 * | 12/2008 | Machimura et al. .............. | 712/1 |
| 2009/0241010 A1 * | 9/2009 | Yano et al. ..................... | 714/764 |
| 2010/0077266 A1 * | 3/2010 | Kanno et al. ................... | 714/704 |
| 2011/0093741 A1 * | 4/2011 | Liang et al. .................... | 714/6.1 |
| 2011/0307741 A1 * | 12/2011 | Chen et al. .................... | 714/38.1 |

FOREIGN PATENT DOCUMENTS

CN         1983179 A      6/2007

\* cited by examiner

*Primary Examiner* — Kamini Patel

(74) *Attorney, Agent, or Firm* — Rabin & Berdo, P.C.

(57) ABSTRACT

A debug method for computer system is disclosed. The method includes the following steps. Firstly, a first index is increased. Next, a first debug data to a $j^{th}$ debug data are received via a debug port of controller. Then, the first debug data to the $j^{th}$ debug data are sequentially stored to a first memory block of a storage unit of the controller according to the second index of controller. Afterwards, the $(i+1)^{th}$ debug data to the $j^{th}$ debug data are copied to the second memory block from the first memory block according to the increased first index before a controller's power supply is removed or the computer system enters a sleep state. Lastly, an application is implemented so that the second memory block is read according to the first index; wherein, i and j are integers.

7 Claims, 2 Drawing Sheets

DEBUG METHOD FOR COMPUTER SYSTEM

This application claims the benefit of Taiwan application Ser. No. 99118226, filed Jun. 4, 2010, the subject matter of which is incorporated herein by reference.

BACKGROUND OF THE INVENTION

1. Field of the Invention

The invention relates in general to a debug method for computer system, and more particularly to a debug method for computer system without using debug card.

2. Description of the Related Art

During the computer booting process, the central processor reads the basic I/O system (BIOS) to perform and test the initial setting of the peripheral hardware (such as hard disc and disc drive) of a computer. After the normal operation of the peripheral hardware elements is confirmed, the central processor of the computer starts to read the data of the operating system for booting process stored in the hard disc, so as to load in the control and operation of various hardware/software elements of the computer. If abnormality of hardware setting or computing error of software occurs during the booting process, the computer cannot be smoothly started up or may even crash. Meanwhile, a debug card is used for testing the operation of the computer and assists the user to smoothly identify and shoot the problem of booting error.

The commonly seen debug card displays the debug data generated during the debugging process on single or multiple 7-segment displays. Referring to FIG. 1, a conventional computer performing debugging with a debug card is shown. The conventional computer 1 includes a central processor 12 and a main-board 11. The central processor 12 is disposed on the main-board 11. The debug card 13 is disposed on the main-board 11 and coupled to the central processor 12.

The debug card 13 includes a bus interface 132, a micro-processing chip 134 and a 7-segment display 136, wherein the micro-processing chip 134 is electrically connected to the bus interface 132 and the 7-segment display 136. The micro-processing chip 134 is used for reading the debug data, such as the power on self test code (POST code), transmitted via the bus interface 132 when the central processor 12 implements the basic I/O system. The micro-processing chip 134 controls the 7-segment display 136 to display the debug data for the debugging during the booting process.

However, such practice not only requires an extra debug card, but also needs to open the computer casing to install the debug card therein. If there are multiple computers need to debug the booting process, the debug card has to be repeatedly inserted into and removed from each computer, which is time-consuming and very inconvenient.

SUMMARY OF THE INVENTION

The invention is directed to a debug method for computer system without using extra debug card or opening the computer's casing to install the debug card, hence largely increasing the convenience of use.

According to a first aspect of the present invention, a debug method for computer system is disclosed. The method includes the following steps. Firstly, a first index is increased. Next, a first debug data to a $j^{th}$ debug data are received via a debug port of controller. Then, the first debug data to the $j^{th}$ debug data are sequentially stored to a first memory block of a storage unit of the controller according to the second index of controller. Afterwards, the $(i+1)^{th}$ debug data to the $j^{th}$ debug data are copied to the second memory block from the first memory block according to the increased first index before a controller's power supply is removed or the computer system enters a sleep state. Lastly, an application is implemented so that the second memory block is read according to the first index; wherein, i and j are integers.

The above and other aspects of the invention will become better understood with regard to the following detailed description of the preferred but non-limiting embodiment (s). The following description is made with reference to the accompanying drawings.

DETAILED DESCRIPTION OF THE INVENTION

To improve the inconvenience that the conventional booting process must use a debug card for debugging, a debug method for computer system is disclosed. The method includes the following steps. Firstly, a first index is increased. Next, a first debug data to a $j^{th}$ debug data are received via a debug port of controller. Then, the first debug data to the $j^{th}$ debug data are sequentially stored to a first memory block of a storage unit of the controller according to the second index of controller. Afterwards, the $(i+1)^{th}$ debug data to the $j^{th}$ debug data are copied to the second memory block from the first memory block according to the increased first index before a controller's power supply is removed or the computer system enters a sleep state. Lastly, an application is implemented so that the second memory block is read according to the first index; wherein, i and j are integers.

Figure 1:
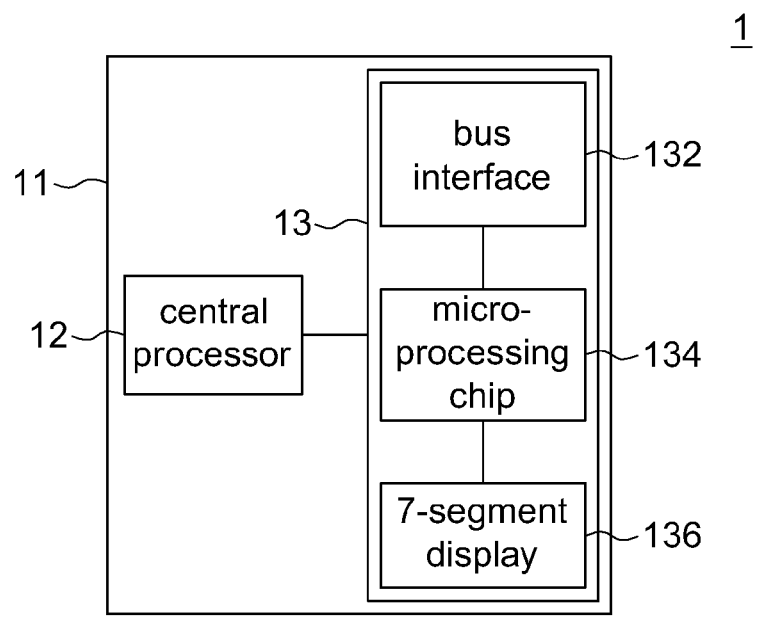
FIG. 1 shows a conventional computer performing debugging with a debug card.
Figure 2:
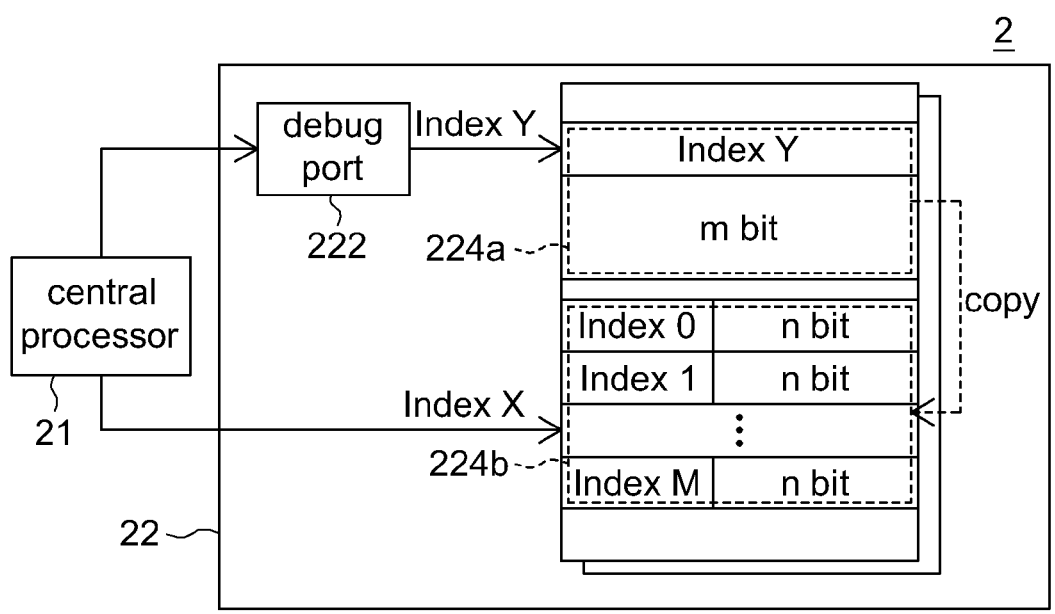
FIG. 2 shows block diagram of a computer system.
Figure 3:
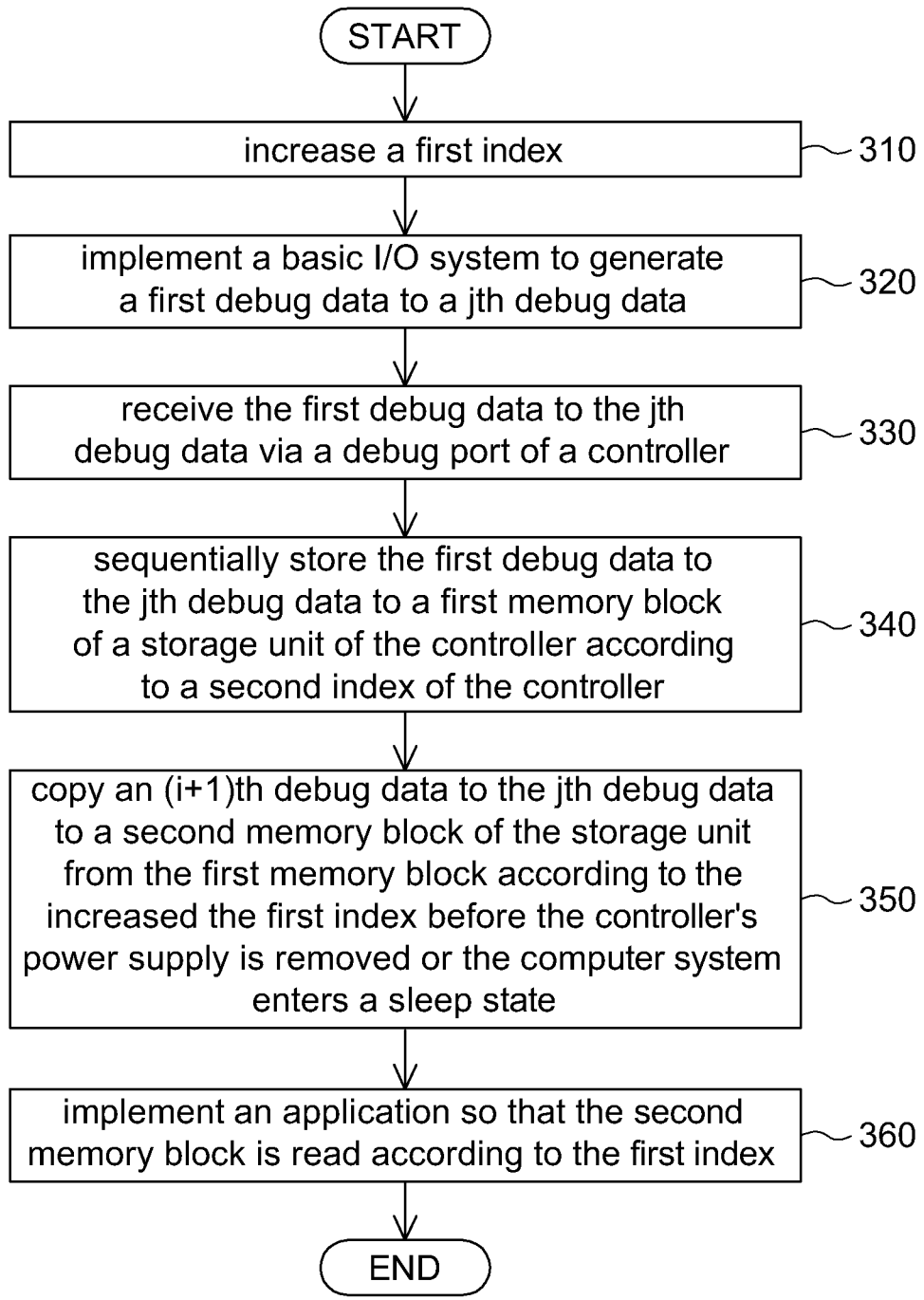
FIG. 3 shows a flowchart of a debug method for computer system.

Referring to both FIG. 2 and FIG. 3. FIG. 2 shows block diagram of a computer system. FIG. 3 shows a flowchart of a debug method for computer system. The computer system 2, realized by such as a laptop computer or a desktop computer, includes a central processor 21 and a controller 22. The controller 22, realized by such as an embedded controller (EC) or a keyboard controller (KBC), includes a debug port 222 and a storage unit 224. The debug port 222, realized by such as an I/O port 80$h$, is used for receiving a first debug data to a $j^{th}$ debug data outputted by the central processor 21 after implementing a basic I/O system (BIOS). The first debug data to the $j^{th}$ debug data are debug codes or also referred as power on self test (POST) code.

The storage unit 224 is realized by such as an embedded controller (EC) random access memory (RAM) or a real time clock (RTC) random access memory (RAM). The storage unit 224 includes a first memory block 224$a$ and a second memory block 224$b$. The first memory block 224$a$ stores a second index Index Y and the first debug data to the $j^{th}$ debug data received by the debug port 222. The second memory block 224$b$ stores the first index Index X and the $(i+1)^{th}$ debug data to the $j^{th}$ debug data copied from the first memory block 224$a$. Wherein, X ranges between 0~M, i and j are integers. The said i is equal to 0 or is larger than 0. In other words, the second memory block 224$b$ can copy all or the last few items of debug data of the first memory block 224$a$.

The debug method for computer system 1 includes the following steps. Firstly, the method begins at step 310, a first index Index X is increased by the controller 22 when the power is activated. For example, the first index Index X is increased from Index 0 to Index 1. Next, the method proceeds to step 320, a basic I/O system is implemented by the central processor 21 so that a first debug data to a $j^{th}$ debug data are generated. Then, the method proceeds to step 330, the first debug data to the $j^{th}$ debug data are received via a debug port of the controller 22. Afterwards, the method proceeds to step 340, the first debug data to the $j^{th}$ debug data are sequentially stored to a first memory block 224a of a storage unit 224 of the controller 22 according to the second index Index Y of the controller 22.

If the computer system 2 crashes during the booting process, the user will press the power key to enable forced shutdown. When the power key is pressed, the processing is similar to step 350, the $(i+1)^{th}$ debug data to the $j^{th}$ debug data are copied to the second memory block 224b of the storage unit 224 from the first memory block 224a according to the increased first index Index X before the power supply of the controller 22 is removed or the computer system 2 enters a sleep state. Then, when the user would like to check the debug data, the processing is similar to step 360, the central processor 21 implements an application so that the second memory block 224b is read according to the first index Index X. The said application is stored in a portable storage device (such as a universal serial bus (USB) flash drive) for the user's convenience.

The said debug method for computer system 2 without using extra debug card or opening the computer's casing to install the debug card, hence largely increasing the convenience of use. In addition, the controller 22 will increase the first index Index X each time when the power supply is activated, so that the second memory block 224b can reserve the generated debug data of previous crashes. Thus, the programmer can perform a thorough debugging process according to the generated debug data of previous crashes.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A debug method for computer system, comprising:
   increasing a first index;
   receiving a first debug data to a $j^{th}$ debug data via a debug port of a controller;
   sequentially storing the first debug data to the $j^{th}$ debug data to a first memory block of a storage unit of the controller according to a second index of the controller;
   copying an $(i+1)^{th}$ debug data to the $j^{th}$ debug data to a second memory block of the storage unit from the first memory block according to the increased first index before the controller's power supply is removed or the computer system enters a sleep state; and
   implementing an application so that the second memory block is read according to the first index;
   wherein, i and j are integers.

2. The debug method according to claim 1, wherein i is equal to 0.

3. The debug method according to claim 1, wherein i is larger than 0.

4. The debug method according to claim 1, further comprising:
   implementing a basic I/O system to generate the first debug data to the $j^{th}$ debug data.

5. The debug method according to claim 1, wherein the controller is an embedded controller (EC).

6. The debug method according to claim 1, wherein the controller is a keyboard controller (KBC).

7. The debug method according to claim 1, wherein the application is stored in a portable storage device.

* * * * *